United States Patent
O'Rourke et al.

(10) Patent No.: US 12,131,189 B2
(45) Date of Patent: Oct. 29, 2024

(54) CHANGE MANAGEMENT SERVICE

(71) Applicant: VMWARE, INC., Palo Alto, CA (US)

(72) Inventors: Thomas James O'Rourke, Surrey (GB); Brian Davis, Valrico, FL (US); Abhinandan Baheti, Bhilwara (IN); Matthew Carpenter, Kent (GB); Vivek Kumar Singh, Zurich (CH)

(73) Assignee: VMware LLC, Palo Alto, CA (US)

( * ) Notice: Subject to any disclaimer, the term of this patent is extended or adjusted under 35 U.S.C. 154(b) by 0 days.

(21) Appl. No.: 18/104,806

(22) Filed: Feb. 2, 2023

(65) Prior Publication Data
US 2024/0176660 A1   May 30, 2024

(30) Foreign Application Priority Data

Nov. 30, 2022   (IN) .............................. 202241069046

(51) Int. Cl.
G06F 9/50 (2006.01)
G06F 9/54 (2006.01)
H04L 41/12 (2022.01)

(52) U.S. Cl.
CPC .............. *G06F 9/5005* (2013.01); *G06F 9/54* (2013.01); *H04L 41/12* (2013.01)

(58) Field of Classification Search
CPC ........... G06F 9/5005; G06F 9/54; H04L 41/12
See application file for complete search history.

(56) References Cited

U.S. PATENT DOCUMENTS

| | | | |
|---|---|---|---|
| 10,191,781 B2 * | 1/2019 | Thimmappa | G06F 9/5072 |
| 11,586,847 B1 * | 2/2023 | Thomas | G06F 8/71 |
| 2019/0349426 A1 * | 11/2019 | Smith | G06F 16/1834 |
| 2021/0035116 A1 * | 2/2021 | Berrington | G06N 5/04 |
| 2021/0337033 A1 * | 10/2021 | Madisetti | H04L 67/104 |
| 2022/0180346 A1 * | 6/2022 | Gadewar | G06Q 20/349 |
| 2024/0176659 A1 * | 5/2024 | Goennheimer | G06F 9/54 |

FOREIGN PATENT DOCUMENTS

CA        3137168 A1 * 10/2020 ........... G06F 16/332

\* cited by examiner

*Primary Examiner* — Kristie D Shingles
(74) *Attorney, Agent, or Firm* — King Intellectual Asset Management

(57) ABSTRACT

A computer-implemented method, computer-readable medium, and computer system that involve operations including receiving, from a computing cluster, a first request for changing a first object type specified by an approval policy resource, where the approval policy resource is a first one of a plurality of custom resources; identifying, in response to receiving the first request and using a second custom resource of the plurality, an approval process associated with the first object type; performing the approval process associated with the first object type; and sending, to the computing cluster, a first notification indicating that the request has been approved.

20 Claims, 6 Drawing Sheets

CHANGE MANAGEMENT SERVICE

RELATED APPLICATIONS

Benefit is claimed under 35 U.S.C. 119(a)-(d) to Foreign Application Serial No. 202241069046 filed in India entitled "A CHANGE MANAGEMENT SERVICE", on Nov. 30, 2022, by VMware, Inc., which is herein incorporated in its entirety by reference for all purposes.

TECHNICAL FIELD

This disclosure relates to computer-implemented methods, computer-readable storage media and computer systems for a change management service.

BACKGROUND

Kubernetes is an open-source system for automating deployment, scaling and management of containerized applications. Containerized applications are applications that run in isolated runtime environments called containers. Containers encapsulate an application with all its dependencies, including system libraries, binaries, and configuration files. Containerized applications are portable in that the application behaves consistently across different hosts. Containerized applications run on a host system and share the existing operating system (OS) provided by the host system.

A virtual machine (VM) is a compute resource implemented in software that abstracts resources (processor, memory, networking, etc.) of a physical computer to run programs and deploy apps. Each VM runs its own operating system and functions independently of the other VMs, even when they are all running on the same host. Whereas virtual machines virtualize an entire machine down to the hardware layers, containers only virtualize software layers above the OS level.

A Kubernetes cluster is a set of machines (nodes) for running containerized applications. Executing Kubernetes means executing a cluster. A cluster contains a control plane and one or more compute machines or nodes. The control plane maintains the desired state of the cluster, such as which applications are running and which container images they use.

In a Kubernetes system, containers are grouped into a logical unit called a pod. Containers in the same pod share the same resources and network, and maintain a degree of isolation from containers in other pods. The pods are distributed across nodes of the Kubernetes system and an image cache is provided on each node to speed up pod deployment. A node includes an OS, such as Linux®, and a container engine executing on top of the OS that supports the containers of the pod. Kubernetes control plane components (e.g., a kubelet) execute on the OS alongside the containers. Thus, a node includes multiple containers and control plane components executing on a shared OS.

SUMMARY

In certain deployments, software as a service ("SaaS") applications, which can be hosted on a Kubernetes platform (or other container orchestration systems), are typically required to obtain compliance (and remain compliant) with accreditations such as Federal Risk and Authorization Management Program (FedRAMP), Systems and Organizations Controls 2 (SOC2), Payment Card Industry Data Security Standard (PCI DSS), and Health Insurance Portability and Accountability Act (HIPAA). Having the accreditation assures users of the SaaS applications that security and compliance processes are adopted and maintained.

There are, however, hundreds of infrastructure controls that must be understood, assessed, complied with, and proven to auditors to maintain accreditations. For example, accreditations require strict architectures, processes, and procedures along with approvals, change management, and advisory boards. Given these requirements, SaaS applications users may request deployments or changes to production, e.g., new infrastructure, clusters, or administrative changes, to maintain compliance with accreditations. Such requests require a change request (CR) for which a user can submit a ticket to an administrator. The administrator can be a platform administrator responsible for managing the Kubernetes platform on which the SaaS applications are hosted. Furthermore, compliance accreditations typically require annual audits to prove that the SaaS applications are compliant.

Existing systems require users to manually fill out and file service desk tickets to request a compliance related change. The tickets are then submitted for manual approval and execution by a platform administrator. This manual approach of maintaining approvals needed for regulated environments does not scale as infrastructure and access models become more complex. Furthermore, existing systems use third-party applications to perform audit related tasks. Since these tasks are outsourced to a third-party, the evidence gathering process for compliance accreditations using these third-party platforms can be time-consuming.

This specification describes methods and systems that provide an approval platform for compliant services that codifies knowledge datasets into sets of policies and approval processes. The approval platform, which can be provided by a Kubernetes administrator, removes bottlenecks and time spent transferring approval data between service systems and a work-load deployment platform. This ultimately improves the efficiency and speed of services by directly integrating the approval process with cloud-native services. Additionally, the approval platform eliminates the lengthy processes of querying and responding between various stakeholders when requesting a change. Further, the approval platform provides dynamic approvals, which allows SaaS teams using their native tools and processes to deploy changes to production.

The details of one or more implementations of the subject matter described in this specification are set forth in the accompanying drawings and the description below. Other features, aspects, and advantages of the subject matter will become apparent from the description, the drawings, and the claims.

DESCRIPTION OF DRAWINGS

Like reference symbols in the various drawings indicate like elements.

DETAILED DESCRIPTION

This specification describes a computer system, computer-readable media and computer instructions for a change management service that can be deployed on a Kubernetes platform.

This specification describes methods and systems that provide an approval platform for compliant services that codifies knowledge datasets into sets of policies and approval processes. The approval platform can be provided by a Kubernetes platform administrator. The approval platform removes bottlenecks and time spent transferring approval data between service systems and a work-load deployment platform. This ultimately improves the efficiency and speed of services by directly integrating the approval process with cloud-native services. Additionally, the approval platform eliminates the lengthy processes of querying and responding between various stakeholders when requesting a change. Further, the approval platform provides dynamic approvals, which allows SaaS users to use their native tools and processes to deploy changes to production systems.

The approval platform can be part of a multi-tenant Kubernetes platform that hosts a number of SaaS applications. The approval platform serves as a Kubernetes native approval system. As the approval system, the approval platform allows for self-service change requests to be built natively into the stack. Thus, SaaS applications users do not need to leverage external tools to maintain compliance with compliance accreditations. The approval platform enables users to make changes via a self-service model, within the boundaries (e.g., policies) set by a platform administrator (e.g., a cluster operator), and automatically generates approval requests for the platform administrators when the policies are breached or a restricted change is attempted.

As described in more detail below, the approval platform is deployed as a Kubernetes operator that includes one or more controllers that monitor for changes to a set of custom resources. Example changes include creating, modifying, or deleting to object types specified by the custom resources. The approval platform is configured to perform autonomous actions based on detected changes to the custom resources. This is known as a Kubernetes operator pattern. Note that although the present disclosure uses Kubernetes as the host platform, other example container or cluster orchestration systems are possible and are contemplated herein.

Figure 1:
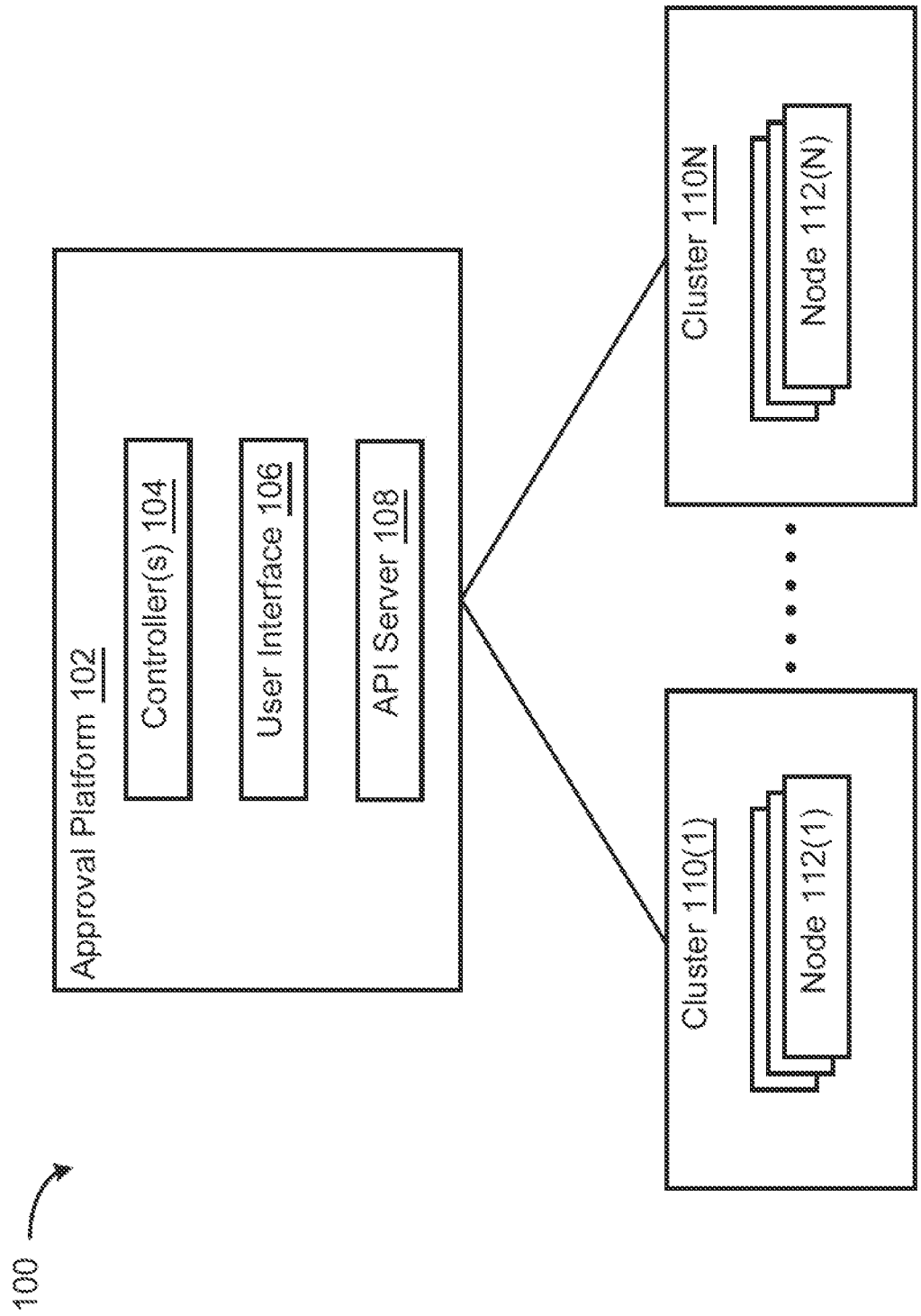
FIG. 1 illustrates an example operating environment that includes an approval platform, according to some implementations.

FIG. 1 illustrates an example operating environment 100 that includes an approval platform 102, according to some implementations. Within examples, the operating environment 100 can be a single cluster deployment or a multi-cluster deployment that spans hyperscalers and/or multiple clouds. In the single cluster deployment, the approval platform 102 serves as a standalone policy approval engine on a single cluster. In the multi-cluster deployment, multiple instances of the approval platform can be deployed across workload clusters, and additionally on a management cluster in the same site or region as the workload clusters. When the approval platform 102 is deployed on the management cluster, it serves as a central entity to perform approval tasks for the operating environment 100. In this arrangement, each workload cluster operator is registered with the management cluster approval platform.

FIG. 1 illustrates a multi-cluster deployment. As shown, operating environment 100 includes an approval platform 102 that is communicatively coupled with a number of Kubernetes clusters 110(1)-(N). The Kubernetes clusters 110(1)-(N) are referred to collectively as "Kubernetes clusters 110" and individually as "Kubernetes cluster 110." The approval platform 102 can be provided, and hosted, by a Kubernetes administrator platform that manages the Kubernetes clusters 110. In some examples, the approval platform 102 is deployed on one or more physical or virtual machines located at a location, such as at a data center, associated with the Kubernetes clusters 110. In other examples, the approval platform 102 is hosted in a public or private cloud.

In some implementations, each Kubernetes cluster 110 may be deployed on-premises with respect to the approval platform 102 or hosted off-premises in a public or private cloud environment. As shown in FIG. 1, each Kubernetes cluster 110 can include one or more nodes 112, such as node 112(1) and node 112(N). Further, each Kubernetes cluster 110 can be a multi-tenant Kubernetes platform. The multi-tenant Kubernetes platform can be achieved by granting namespace-level access to multiple tenants and limiting the use of cluster-level resources for each tenant.

In some implementations, the approval platform 102 includes one or more controllers 104, user interfaces (UIs) 106 that are accessible by approved users, and an API server 108. The approval platform 102 can use the API server 108 to communicate with the Kubernetes clusters 110. The one or more controllers 104 are configured to monitor for changes from the Kubernetes clusters 110 to a specific set of resources, called "Custom Resources." As described in more detail below, the Custom Resources specify that changes to certain approval types trigger an approval process to be performed by the approval platform 102. The one or more controllers 104 are also configured to act based on a detected change to a particular resource. For example, the platform 102 can perform an approval process in response to detecting the change.

In some implementations, the Custom Resources include: (i) an approval policy resource called "ApprovalPolicy," (ii) an approval request resource called "ApprovalRequest," (iii) an approval process resource called "ApprovalProcess," and (iv) an approval workflow resource called "ApprovalWorkflow." ApprovalPolicy defines the approval or object types that require an approval and in which scenarios or circumstances. As an example, an ApprovalPolicy can define whether an object type requires approval whenever an instance of that type is modified. Additionally, the ApprovalPolicy can define whether approval is required only if certain conditions are met in the object's spec field (e.g., if CPUs are greater than 24 on a pod spec). Further, the ApprovalPolicy stores criteria for mapping controlled resources to actions that are taken once a change request associated with a controlled resource is approved. A controlled resource is any Kubernetes API kind that has a matching ApprovalPolicy object type. ApprovalRequest triggers the approval process and stores the request data so that it can be viewed and accessed by requesters and approvers. ApprovalProcess defines the person or entity that approves the request and in what order if more than one person or entity. ApprovalWorkflow defines one or more workflows that can be performed to fulfill an approval request or that can be performed after a request has been approved.

In some implementations, example approval types that are specified to require approval include:
  Node Group requests: enforce approval for nodes that are larger than pre-approved instance types.

Compliance and security exceptions: if a team requires the use of root containers or privileged pods, an exclusion to a pod security policy could be approved to allow elevated permissions on a cluster.

New infrastructure requests: the deployment of a new account or new production cluster. This could be entirely self-service without approval in lower environments, but requires approval in production.

Network changes: peering a network between two virtual private clouds (VPCs). Here, approval may be required from both the platform and security teams.

Protected application configuration changes: deleting a Kafka Topic or a cluster may require approval in staging and production, but may be allowed via self-service in development environments.

Cluster-level resource access: allowing users to request Custom Resource Definitions (CRDs) to be installed and upgraded.

In some implementations, the UI 106 includes an approver user interface that can be accessed by Kubernetes administrators that are responsible for reviewing and approving changes flagged by the approval platform 102. The approver user interface can include tools and graphical features that allow a Kubernetes administrator to view and approve objects that require approval. Additionally, the UI 106 includes a requester user interface that allows a user to view the status of their requested changes. The requester user interface also includes tools and graphical interfaces that allow the requester to communicate with an approver that is assigned to the request. For example, the requester can communicate with the approver to provide additional information regarding the request.

In some implementations, the one or more controllers 104 are configured to operate in two modes to perform approval procedures. In the first mode, called webhook mode, the one or more controllers 104 detect a request for creating or updating a controlled Kubernetes resources. In particular, the one or more controllers 104 include a mutating admission webhook that is configured to monitor controlled resources as they are requested via the Kubernetes API, and to intercept them if they require approval. The mutating webhook can be used to modify a requested object before creating it, perhaps to add custom annotations for looking up approved resources at a later date. The webhook mode could be used in scenarios where a user requests a large volume that exceeds a threshold size or a protected application configuration change such as deleting a Kafka topic. In the second mode, called workflow mode, the one or more controllers 104 are configured to detect a request that directly invokes an ApprovalRequest. This could occur if a user requests an object that triggers automation to drive an external system, or in scenarios where a complex set of Kubernetes objects are needed. The two operating modes are described in more details in FIGS. 2-3.

Figure 2:
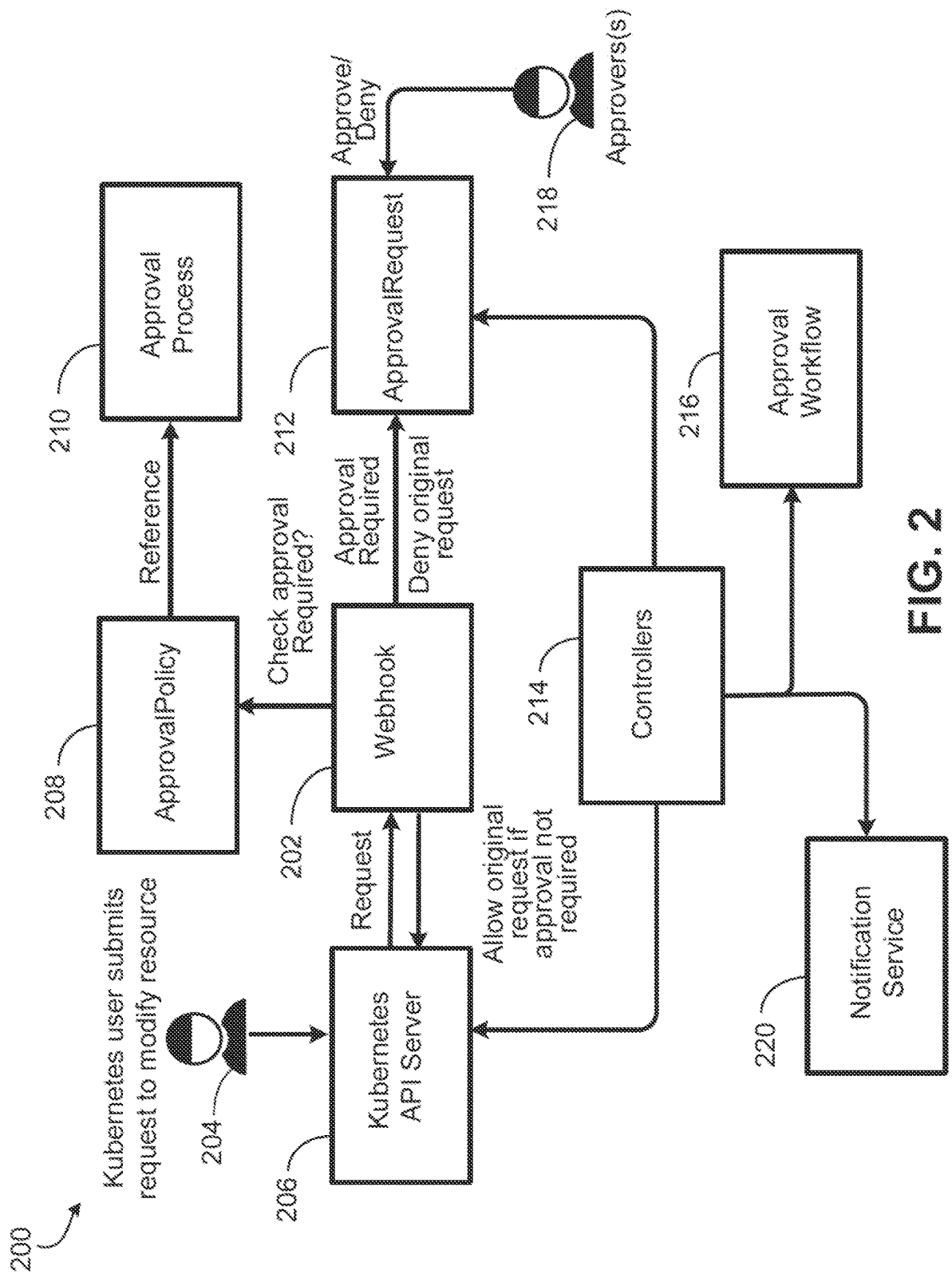
FIG. 2 illustrates a flow diagram for operating in webhook mode, according to some implementations.

FIG. 2 illustrates a flow diagram 200 for operating in webhook mode, according to some implementations. As shown in FIG. 2, a webhook 202 monitors requests received via a Kubernetes API Server 206, perhaps from a user 204. The approval process is triggered by a request to the Kubernetes API Server 206 to create, modify, or delete a controlled resource, as defined in an ApprovalPolicy. The webhook 202 monitors for controlled changes by comparing the incoming request to a set of ApprovalPolicy definitions stored in an approval policy server 208. If the webhook 202 does not identify a match between the received request and an ApprovalPolicy definition, the webhook 202 allows the original request to be performed without an approval procedure.

Conversely, if the webhook 202 identifies a match between the received request and an ApprovalPolicy definition, then the webhook 202 temporarily blocks the request (i.e., the request cannot be performed without approval). Additionally, the webhook 202 identifies an ApprovalProcess for the identified ApprovalPolicy definition, perhaps by using a reference associated with the identified ApprovalPolicy definition to retrieve an associated ApprovalProcess from an approval process database 210. The webhook 202 then generates an ApprovalRequest custom resource object 212 ("ApprovalRequest object 212"). The webhook 202 includes in the generated resource the information provided in the original request.

Once the ApprovalRequest object 212 is created, an approval controller 214 monitors the object for a status change and performs actions based on the status change. As an example, when the ApprovalRequest object 212 is created, the approval controller 214 can retrieve, based on the ApprovalProcess, an associated approval workflow from an approval workflow database 216. Further, the approval controller 214 can identify, perhaps using the ApprovalProcess, an Approver(s) 218 that can review and approve the resource. The Approver(s) 218 can be one or more users or systems that are responsible for reviewing and approving the ApprovalRequest object 212. Once the Approver(s) 218 is identified, the webhook 202 assigns the ApprovalRequest object 212 to the Approver(s) 218.

Additionally, once the ApprovalRequest object 212 is created, the approval controller 214 uses a notification service 220 to provide a notification to the user 204 that informs the user that the request is undergoing an approval process. The notification can be an email, an instant message, or other audible or written message communicated to the user 204 via a user device (not illustrated in FIG. 2). The notification can also include an approval ID, and a link to a requester user interface (e.g., the UI 106 of FIG. 1). As stated previously, the UI allows the user 204 to track a status of the request. Furthermore, the approval controller 214 uses the notification service 220 to provide a notification to the Approver(s) 218 that informs the approver(s) that there is a pending request that needs to be approved.

The approval controller 214 then monitors the ApprovalRequest object 212 for a status change. The ApprovalRequest object 212 can be approved or denied by the Approver(s) 218. As an example, the Approver(s) 218 can perform steps in the ApprovalProcess to approve the ApprovalRequest object 212. As another example, the Approver(s) 218 can provide an input to an approver user interface (e.g., the UI 106 of FIG. 1) indicating that the ApprovalRequest object 212 is approved.

If the ApprovalRequest object 212 is approved, the approval controller 214 fulfills the original API request and notifies the user 204, via notification service 220, of the approval. While fulfilling the original API request, the approval controller 214 adds a set of annotations that mark the ApprovalPolicy associated with the ApprovalRequest object 212 as approved. Thus, if the same request is submitted for the same object type in the future without changes, the webhook 202 can automatically approve the request without triggering the approval process. The ApprovalPolicy can also support a mode where once a request of a particular name is approved, the user or tenant can continue to manage that object without further approval. This allows tenants, such as cluster administrators, to implement "approve once" policies for objects such as CRDs. Thus, if a tenant develops their own CRD, the tenant only has to go through the approval process once. The tenant can subsequently make changes as frequently as they like.

If the ApprovalRequest object 212 is denied, the approval controller 214 uses the notification service 220 to provide the user 204 with a notification indicting the rejection. In some examples, the notification may direct the user 204 to provide additional information for the approval. In these examples, the user 204 can provide the additional information through the UI and the approval procedure can be performed again.

Figure 3:
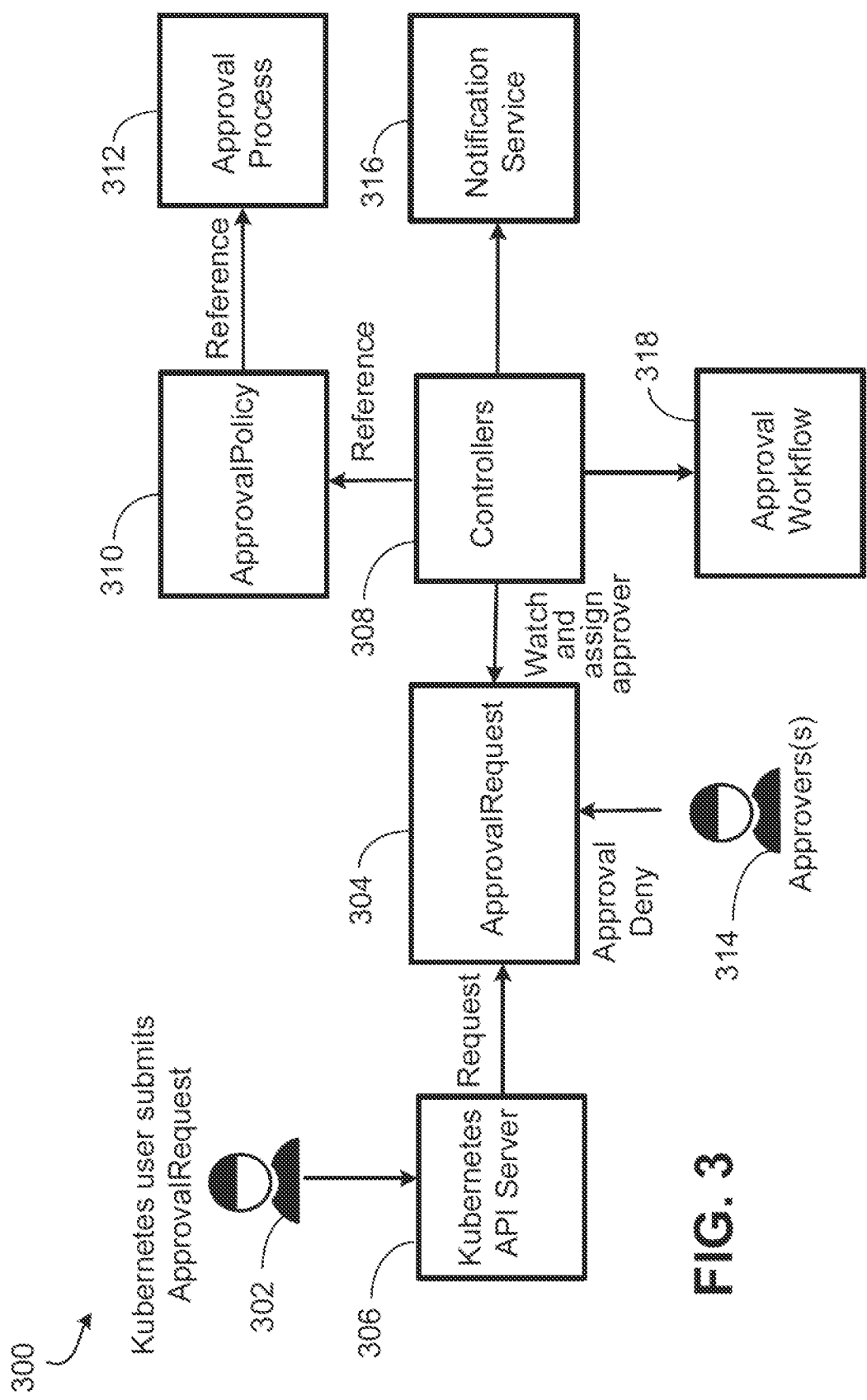
FIG. 3 illustrates a flow diagram for operating in workflow mode, according to some implementations.

FIG. 3 illustrates a flow diagram 300 for operating in workflow mode, according to some implementations. As shown in FIG. 3, a user 302 creates an ApprovalRequest Kubernetes Custom Resource object 304 ("ApprovalRequest object 304") via a Kubernetes API server 306. An approval controller 308 monitors the Kubernetes API server 306 for the creation of ApprovalRequest objects. Once the approval controller 308 detects a new ApprovalRequest object, e.g., ApprovalRequest object 304, the approval controller 308 references an ApprovalPolicy object 310 and an ApprovalProcess object 312 in order to assign the ApprovalRequest to a corresponding one or more approver(s) 314, perhaps in a particular order.

The approval controller 308 uses a notification service 316 to provide a notification to the user 204 that informs that the user 302 that the request is undergoing an approval process. The notification can be an email, an instant message, or other audible or written message communicated to the user 302 through a device operated by the user (not illustrated in FIG. 3). The notification can also include an approval ID, and a link to a user interface provided by the administrator platform (e.g., the approval platform 102). Furthermore, the approval controller 308 uses the notification service 316 to provide a notification to the Approver(s) 314 that informs the approver(s) that there is a pending request that needs to be approved.

Once the steps in the ApprovalProcess have been approved or completed, the approval controller 308 invokes an approval workflow 318 defined in the relevant ApprovalPolicy. The approval workflow 318 could be a complex Kubernetes-based task which involves creating or updating multiple objects. Alternatively, it could call out to an external automation system.

Once the ApprovalRequest object 304 is approved, and approval workflow 318, if applicable, has been executed, the approval controller 308 notifies the user 302, via notification service 316, of the approval. After the ApprovalRequest object 304 is approved, the approval controller 308 adds a set of annotations that mark the object as approved. Thus, if the same request is submitted for the object in the future without changes, the approval controller 308 can automatically approve the request pass without triggering the approval process. The ApprovalPolicy can also support a mode where once a request of a particular name is approved, the user or team can continue to manage that object without further approval. This allows users, such as cluster administrators, to implement "approve once" policies for object such as CRDs. Thus, if a tenant develops their own CRD, the tenant only has to go through the approval process once. The tenant can subsequently make changes as frequently as they like.

Returning to FIG. 1, the approval platform 102 supports both single cluster deployments and tiered multi-cloud, multi-cluster deployments spanning hyperscalers and on-premise clusters. In one form, the approval platform 102 functions as a standalone approval policy enforcement engine on a single cluster. In another form, multiple approval platforms 102 can be deployed across many workload clusters, and additionally on a management cluster in the same site or region. When the approval platform is deployed on a management cluster it is deployed in a different operating mode, and acts as a central entity to define ApprovalPolicies for an environment. Each workload cluster approval platform is then registered with a single management cluster approval platform. In some examples, multiple approval platforms 102 can be deployed across many in a three-tiered federated architecture. In this architecture, a plurality of workload clusters are grouped based on a type of the workload cluster (e.g., Google, Amazon Web Services, Azure, etc.). Thus, a first set of workload clusters of a first type are grouped together, a second set of workload clusters of a second cluster are grouped together, and so on.

Figure 4:
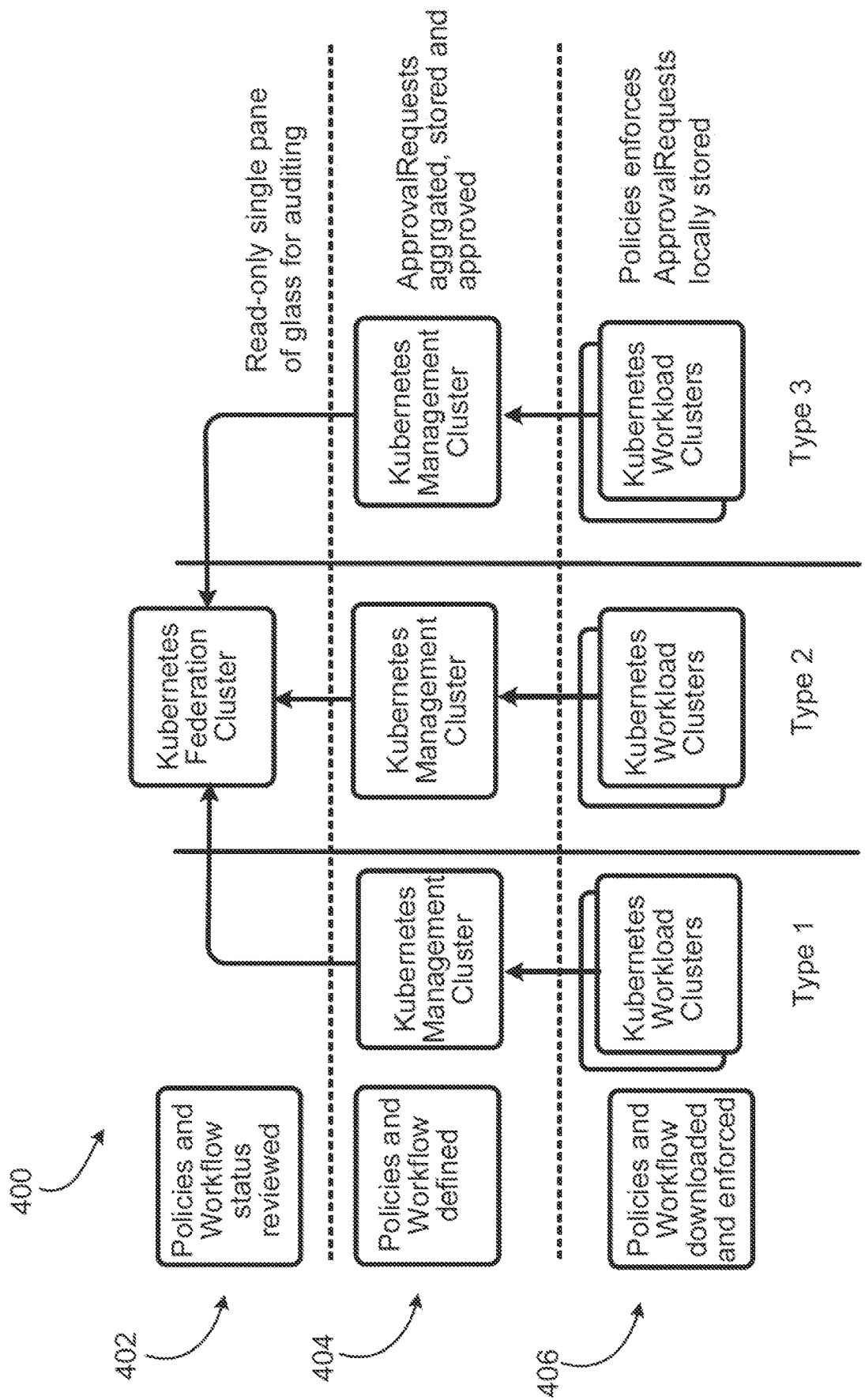
FIG. 4 illustrates a three-tier federated architecture, according to some implementations.

FIG. 4 illustrates a three-tiered federated architecture 400, according to some implementations. As shown in FIG. 4, a plurality of workload clusters are grouped based on a type of the workload cluster, namely Type 1, Type 2, and Type 3. As also shown in FIG. 4, the federated architecture 400 includes three tiers: tier 1 (labelled as "tier 402"), tier 2 (labelled as "tier 404"), and tier 3 (labelled as "tier 406"). The plurality of workload clusters of each type are located in tier 406, and are managed by a respective management cluster in tier 404. Each of the management clusters is coupled to a federation cluster in tier 402.

In this arrangement, ApprovalPolicies are streamed from a management cluster to the corresponding workload clusters. Thus, the definitions of the ApprovalPolicies are maintained at the management cluster level. ApprovalRequests created on workload clusters are then mirrored to equivalent custom resources on the management clusters, and these custom resources are used by an approval platform in the management cluster to drive a UI and API. Doing so allows approval policies and requests to be viewed and approved for an entire environment or region. Each management cluster operator is also able to federate its ApprovalRequest data to a global federation cluster, which operates in read-only mode, to view requests and audit data across fleets of Kubernetes clusters.

In certain environments, e.g., those which are PCI DSS compliant, approvals may need to be requested and approved in-boundary, e.g., inside a particular network that is segmented and firewalled from other parts of the system (e.g., less critical parts of the system). The approval platform in the federated architecture 400 supports this with its distributed architecture and the capability to require policies be streamed from an in-boundary policy management server rather than at a global level. Such a policy management server can include a web UI to allow requests to be approved and rejected from a central console. To allow for complex deployment scenarios while being able to maintain a single pane of glass for auditing, the approval platform supports a read-only web UI at the global level, where data is federated from all regional management clusters so that auditors or other users can monitor and review all requests across multiple clouds and clusters.

In scenarios where the Kubernetes platform hosts a multi-tenant cluster, multiple tenants may require the same CRDs to be installed on the multi-tenant cluster. In existing systems, there is a challenge of coordinating upgrades, e.g., if a tenant wants to upgrade to a newer version but another tenant is not ready to upgrade, then existing systems can prevent a team from implementing updates, or worse, cause an outage if the CRDs are upgraded out-of-band with the consumers. The approval platform 102, however, provides a mechanism for tenants to request changes to cluster-level objects, and have those changes held back for review across multiple tenants. Only once the change is approved by all tenants (or a threshold portion thereof), is the resource updated. This adds an element of control around shared resources, enabling teams and the cluster administrator to collaboratively review and approve changes.

Figure 5:
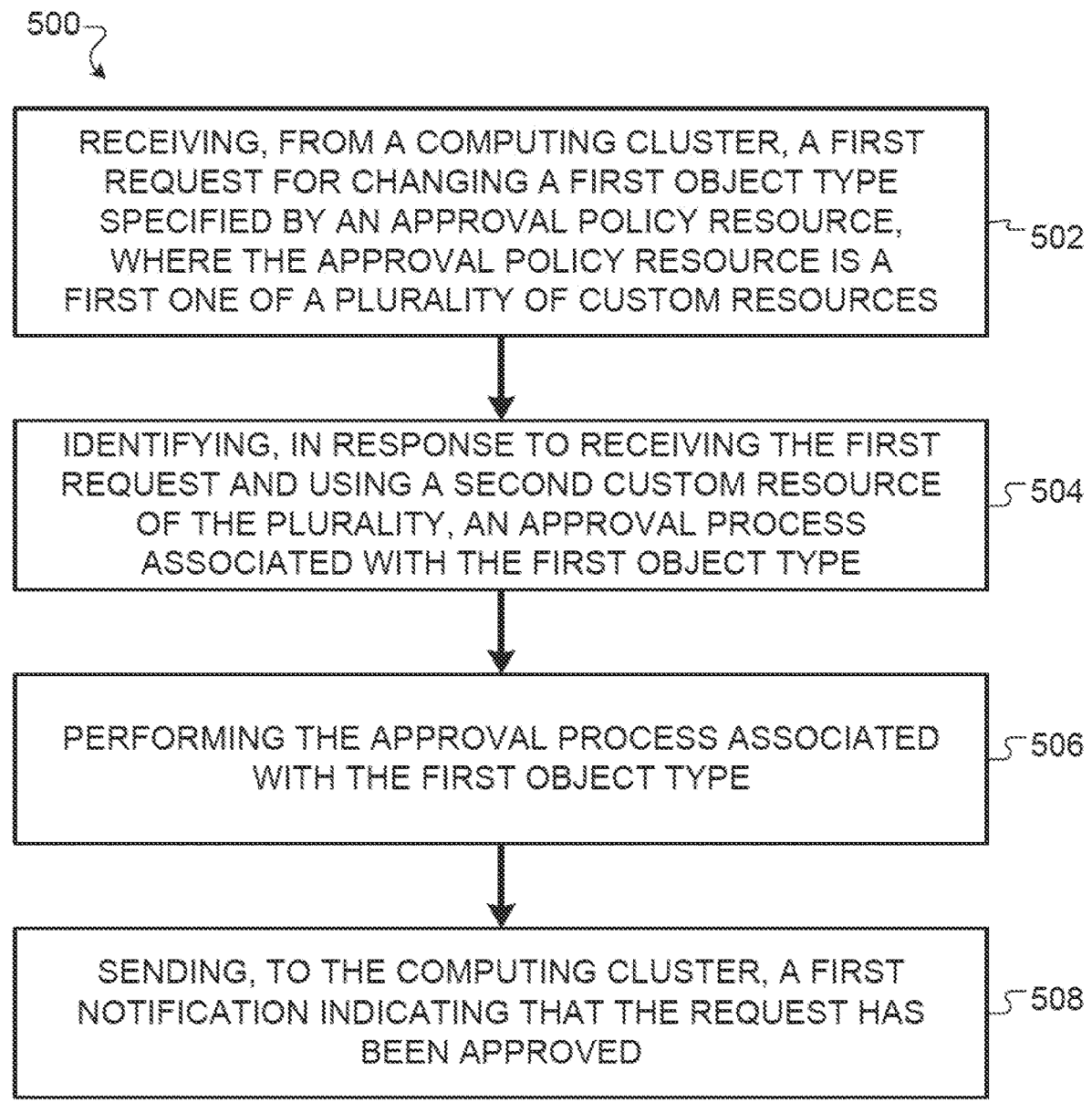
FIG. 5 illustrates an example method, according to some implementations.

FIG. 5 illustrates an example method 500, according to some implementations. For clarity of presentation, the description that follows generally describes method 500 in the context of the other figures in this description. For example, method 500 can be performed by an operator in a containerized environment, such as the approval platform 102 of FIG. 1. It will be understood that method 500 can be performed, for example, by any suitable system, environment, software, hardware, or a combination of systems, environments, software, and hardware, as appropriate. In some implementations, various steps of method 500 can be run in parallel, in combination, in loops, or in any order.

At 502, method 500 involves receiving, from a computing cluster, a first request for changing a first object type specified by an approval policy resource, where the approval policy resource is a first one of a plurality of custom resources.

At 504, method 500 involves identifying, in response to receiving the first request and using a second custom resource of the plurality, an approval process associated with the first object type.

At 506, method 500 involves performing the approval process associated with the first object type.

At 508, method 500 involves sending, to the computing cluster, a first notification indicating that the request has been approved.

In some implementations, the operator includes a mutating admission webhook, and wherein receiving, from the computing cluster, a first request for changing a first object type specified by the approval policy resource involves: monitoring, using the mutating admission webhook, a plurality of requests received via an application programming interface (API), each of the plurality of requests including an API kind; comparing each of the API kinds to a plurality of object types specified by the approval policy resource; and determining that a first API kind in the first request corresponds to the first object type.

In some implementations, performing the approval process associated with the first object type further involves: identifying, using a third custom resource of the plurality, one or more approvers responsible for approving the first object type; assigning the first request to the one or more approvers; and receiving an indication, from the one or more approvers, that the first request has been approved.

In some implementations, method 500 further involves: sending, to the computing cluster, a second notification indicating that the first request is undergoing an approval process.

In some implementations, the second notification comprises at least one of: an approval identifier (ID) associated with the first request or a link to a user interface for tracking a status of the first request.

In some implementations, the approval policy resource specifies a plurality of object types that require approval, the plurality of object types comprising one or more of: (i) Node Group requests, (ii) Compliance and security exceptions, (iii) New infrastructure requests, (iv) Network changes, (v) protected application configuration changes, and Cluster-level resource access.

In some implementations, performing the approval process associated with the first object type further involves adding an annotation to the first object type that indicates that the first object type is approved.

In some implementations, the operator is a Kubernetes operator, and the computing cluster is a Kubernetes cluster.

Figure 6:
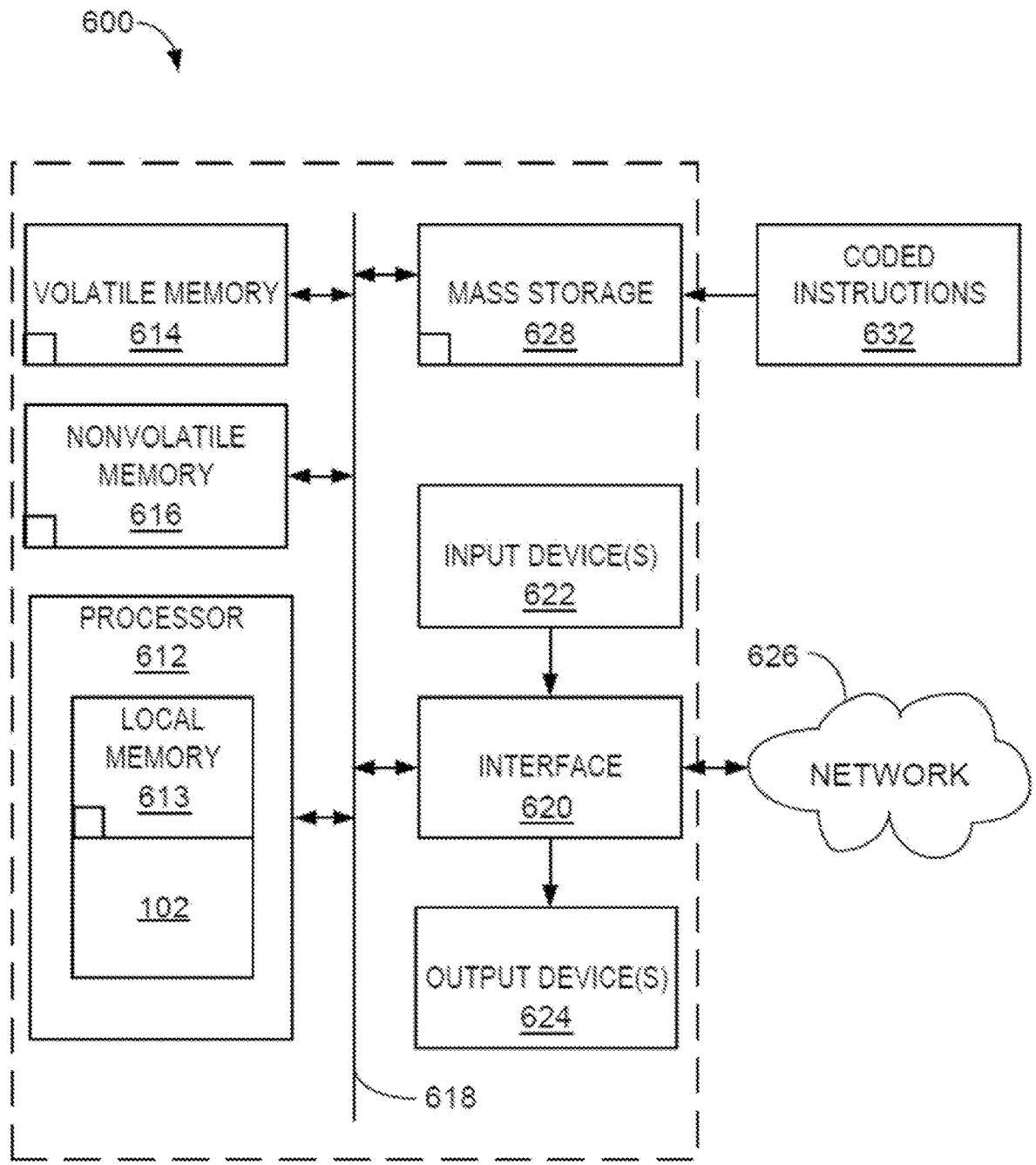
FIG. 6 illustrates a block diagram of an example of a processing platform, according to some implementations.

FIG. 6 is a block diagram of an example of a processing platform 600 configured to execute the techniques described in this disclosure, specifically, the methods described above with reference to FIGS. 1-4. The processor platform 600 can be, for example, a server, a personal computer, a workstation, a self-learning machine (e.g., a neural network), a mobile device (e.g., a cell phone, a smart phone, a tablet computer), a personal digital assistant (PDA), an Internet appliance, or any other type of computing device. In some implementations, the processor 612 implements the components shown in FIG. 1, especially, the approval platform 102.

The processor platform 600 includes a processor 612, which is hardware. For example, the processor 612 can be implemented by one or more integrated circuits, logic circuits, microprocessors, graphics processing units (GPUs), digital signal processors (DSPs), or controllers. The hardware processor 612 can be a semiconductor, e.g., silicon, based device. The hardware processor 612 can implement the components of the systems described with reference to FIGS. 1-4.

The processor 612 includes a local memory 613 (e.g., a cache). The processor 612 is in communication with a main memory including a volatile memory 614 and a non-volatile memory 616 via a bus 618. The volatile memory 614 can be implemented by synchronous dynamic random access memory (SDRAM), dynamic random access memory (DRAM) or other type of random access memory device. The non-volatile memory 616 can be implemented by flash memory and/or any other desired type of memory device. A memory controller controls access to the main memory 614, 616.

The process platform 600 also includes an interface circuit 620 implemented by any type of interface standard, for example, an Ethernet interface, a universal serial bus (USB), a wired or wireless interface, a near field communication (NFC) interface and/or a PCI express interface. One or more input devices 622 are connected to the interface circuit 620. The input devices permit a user to enter data and/or commands to the processor 612. The input devices can be implemented by, for example, an audio sensor, a microphone, a camera (still or video), a keyboard, a button, a mouse, a touchscreen, a track-pad, a trackball, isopoint and/or a voice recognition system.

One or more output devices 624 are also connected to the interface circuit 620. The output devices 624 can be implemented, for example, by display devices, e.g., light emitting diode (LED), an organic LED (OLED), a liquid crystal display (LCD), a cathode ray tube display (CRT), an in-place switching (IPS) display, a touchscreen, etc. and/or a tactile output device, a printer and/or speaker. The interface circuit 620 typically includes a graphics driver card, a graphics driver chip and/or a graphics driver processor.

The interface circuit 620 also includes a communication device such as a transmitter, a receiver, a transceiver, a modem, a residential gateway, a wireless access point, and/or a network interface to facilitate exchange of data with external machines (e.g., computing devices of any kind) via a network 626. The communication can be via, for example, an Ethernet connection, a digital subscriber line (DSL) connection, a telephone line connection, a coaxial cable system, a satellite system, a line-of-site wireless system, a cellular telephone system, etc.

The processor platform 600 also includes one or more mass storage devices 628 for storing software and/or data. Examples of such mass storage devices 628 include floppy disk drives, hard disk drives, compact disk drives, redundant array of independent disks (RAID) systems, digital versatile disk (DVD) drives, or combinations of them.

Machine executable instructions 632 represented by the flowchart of FIG. 5 can be stored in the mass storage device 628, in the volatile memory 614, in the non-volatile memory 616, and/or on a removable non-transitory computer readable storage medium such as a CD or DVD.

Certain aspects of the subject matter described in this disclosure can be implemented as a system that includes one or more processors including a hardware-based processor, and a memory storage including a non-transitory computer-readable medium storing instructions which, when executed by the one or more processors including the hardware-based processor, to perform operations including the methods described in this disclosure.

While this specification contains many specific implementation details, these should not be construed as limitations on the scope of any implementation or on the scope of what may be claimed, but rather as descriptions of features that may be specific to particular implementations of the disclosure. Certain features that are described in this specification in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the implementations described above should not be understood as requiring such separation in all implementations, and it should be understood that the described program components and systems can generally be integrated together in a single software product or packaged into multiple software products.

Thus, particular implementations of the subject matter have been described. Other implementations are within the scope of the following claims.

What is claimed is:

1. A computer-implemented method performed by an operator in a containerized environment, the method comprising:
   receiving, from a computing cluster in the containerized environment, a first request for changing a first object type specified by an approval policy resource, wherein the approval policy resource is a first one of a plurality of custom resources, the computing cluster comprising a plurality of nodes running containerized applications;
   identifying, in response to receiving the first request and using a second custom resource of the plurality, an approval process associated with the first object type;
   performing the approval process associated with the first object type, wherein performing the approval process associated with the first object type comprises adding an annotation to the first object type that indicates that the first object type is approved; and
   sending, to the computing cluster, a first notification indicating that the request has been approved.

2. The computer-implemented method of claim 1, wherein the operator comprises a mutating admission webhook, and wherein receiving, from a computing cluster, a first request for changing a first object type specified by the approval policy resource comprises:
   monitoring, using the mutating admission webhook, a plurality of requests received via a Kubernetes application programming interface (API), each of the plurality of requests comprising an API kind;
   comparing each of the API kinds to a plurality of object types specified by the approval policy resource; and
   determining that a first API kind in the first request corresponds to the first object type.

3. The computer-implemented method of claim 1, wherein performing the approval process associated with the first object type further comprises:
   identifying, using a third custom resource of the plurality, one or more approvers responsible for approving the first object type;
   assigning the first request to the one or more approvers; and
   receiving an indication, from the one or more approvers, that the first request has been approved.

4. The computer-implemented method of claim 1, further comprising:
   sending, to the computing cluster, a second notification indicating that the first request is undergoing an approval process.

5. The computer-implemented method of claim 4, wherein the second notification comprises at least one of: an approval identifier (ID) associated with the first request or a link to a user interface for tracking a status of the first request.

6. The computer-implemented method of claim 1, wherein the approval policy resource specifies a plurality of object types that require approval, the plurality of object types comprising one or more of: (i) Node Group requests, (ii) Compliance and security exceptions, (iii) New infrastructure requests, (iv) Network changes, (v) protected application configuration changes, and Cluster-level resource access.

7. The computer-implemented method of claim 1, further comprising:
   receiving a second request for changing the first object type; and
   automatically approving, based at least in part on the annotation, the second request without performing the approval process associated with the first object type.

8. The computer-implemented method of claim 1, wherein the operator is a Kubernetes operator and the computing cluster is a Kubernetes cluster.

9. A non-transitory computer-readable medium storing instructions which, when executed by a hardware-based processor, performs operations comprising:
   receiving, by an operator in a containerized environment and from a computing cluster, a first request for changing a first object type specified by an approval policy resource, wherein the approval policy resource is a first one of a plurality of custom resources;

identifying, in response to receiving the first request and using a second custom resource of the plurality, an approval process associated with the first object type;

performing the approval process associated with the first object type, wherein performing the approval process comprises adding an annotation to the first object type that indicates that the first object type is approved; and sending, to the computing cluster, a first notification indicating that the request has been approved.

10. The non-transitory computer-readable medium of claim 9, wherein the operator comprises a mutating admission webhook, and wherein receiving, from the computing cluster, a first request for changing a first object type specified by the approval policy resource comprises:

monitoring, using the mutating admission webhook, a plurality of requests received via an application programming interface (API), each of the plurality of requests comprising an API kind;

comparing each of the API kinds to a plurality of object types specified by the approval policy resource; and determining that a first API kind in the first request corresponds to the first object type.

11. The non-transitory computer-readable medium of claim 9, wherein performing the approval process associated with the first object type further comprises:

identifying, using a third custom resource of the plurality, one or more approvers responsible for approving the first object type;

assigning the first request to the one or more approvers; and receiving an indication, from the one or more approvers, that the first request has been approved.

12. The non-transitory computer-readable medium of claim 9, the operations further comprising:

sending, to the computing cluster, a second notification indicating that the first request is undergoing an approval process.

13. The non-transitory computer-readable medium of claim 12, wherein the second notification comprises at least one of: an approval identifier (ID) associated with the first request or a link to a user interface for tracking a status of the first request.

14. The non-transitory computer-readable medium of claim 9, wherein the approval policy resource specifies a plurality of object types that require approval, the plurality of object types comprising one or more of: (i) Node Group requests, (ii) Compliance and security exceptions, (iii) New infrastructure requests, (iv) Network changes, (v) protected application configuration changes, and Cluster-level resource access.

15. The non-transitory computer-readable medium of claim 9, further comprising:

receiving a second request for changing the first object type; and automatically approving, based at least in part on the annotation, the second request without performing the approval process associated with the first object type.

16. The non-transitory computer-readable medium of claim 9, wherein the operator is a Kubernetes operator and the computing cluster is a Kubernetes cluster.

17. A system comprising:

one or more processors including a hardware-based processor; and a memory storage including a non-transitory computer-readable medium storing instructions which, when executed by the one or more processors including the hardware-based processor, performs operations comprising:

receiving, by an operator in a containerized environment and from a computing cluster, a first request for changing a first object type specified by an approval policy resource, wherein the approval policy resource is a first one of a plurality of custom resources;

identifying, in response to receiving the first request and using a second custom resource of the plurality, an approval process associated with the first object type;

performing the approval process associated with the first object type, wherein performing the approval process comprises adding an annotation to the first object type that indicates that the first object type is approved; and sending, to the computing cluster, a first notification indicating that the request has been approved.

18. The system of claim 17, wherein the operator comprises a mutating admission webhook, and wherein receiving, from the computing cluster, a first request for changing a first object type specified by the approval policy resource comprises:

monitoring, using the mutating admission webhook, a plurality of requests received via an application programming interface (API), each of the plurality of requests comprising an API kind;

comparing each of the API kinds to a plurality of object types specified by the approval policy resource; and determining that a first API kind in the first request corresponds to the first object type.

19. The system of claim 18, wherein performing the approval process associated with the first object type further comprises:

identifying, using a third custom resource of the plurality, one or more approvers responsible for approving the first object type;

assigning the first request to the one or more approvers; and receiving an indication, from the one or more approvers, that the first request has been approved.

20. The system of claim 18, wherein the operator is a Kubernetes operator and the computing cluster is a Kubernetes cluster.

* * * * *